Figure 1:
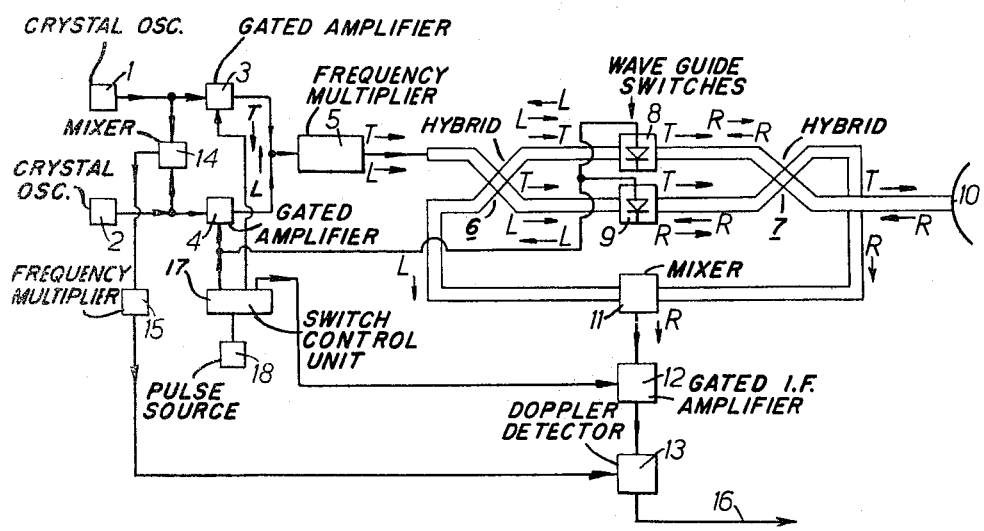

March 29, 1966  R. W. ELDRED  3,243,808
RADAR SYSTEMS WITH HETERODYNE RECEPTION
Filed April 27, 1964

INVENTOR
Raymond William Eldred
BY
Baldwin & Wight
ATTORNEYS

United States Patent Office 3,243,808
Patented Mar. 29, 1966

3,243,808
RADAR SYSTEMS WITH HETERODYNE
RECEPTION
Raymond William Eldred, Galleywood, England, assignor to The Marconi Company Limited, London, England, a British company
Filed Apr. 27, 1964, Ser. No. 362,570
Claims priority, application Great Britain, May 3, 1963, 17,485/63
9 Claims. (Cl. 343—8)

This invention relates to radar systems with heterodyne reception and though not exclusively limited to its application thereto, is very advantageous when used in and is primarily intended for pulsed Doppler radars, i.e. pulsed radars wherein the Doppler shift frequency produced by movement of a reflecting target in relation to the radar transmitter is made use of in the radar receiver, e.g. to determine the target speed.

In pulsed radar systems with heterodyne reception as at present in general use, received high frequency (H.F.) echo signals are heterodyned to an intermediate frequency (I.F.) by means of a local oscillator provided for the purpose. Such a local oscillator is expensive in any event because it must be of high stability and high quality generally. A local oscillator for a Doppler radar, however, is particularly expensive because it must be coherent with respect to the high frequency in the transmitted pulses or with respect to some frequency in fixed frequency relation thereto. The present invention seeks to void the need for the provision of a separate local oscillator solely for the purpose of beating down the received H.F. to the required I.F. and this object is achieved, in carrying out the invention, by deriving local oscillations for heterodyne reception from a carrier source employed for transmission. This provides advantages for all heterodyne-receiver pulsed radar systems but is particularly advantageous in the matter of economy when applied to Doppler radars because of the simple way in which the required coherence of the local oscillations is obtained.

According to this invention a radar system with heterodyne reception includes a source of pre-determined carrier frequency; means providing a second frequency differing from the frequency of said source by a predetermined I.F.; two four terminal hybrids; two energy paths one extending between one of the terminals of one hybrid and one of the terminals of the other hybrid and the other extending between a second terminal of said one hybrid and a second terminal of the other; switchable means inserted in each of said paths and adapted, in one condition of switching, to render the path in which it is inserted a substantially uninterrupted energy propagating path and in the other condition of switching to render said path substantially totally reflective; a mixer with two inputs each fed from one or other of two further hydrid terminals, one in each hybrid; means connecting an output load to the remaining terminal of one hybrid; switchable means adapted in one condition of switching to apply the aforesaid carrier frequency to the remaining terminal of the other hybrid and in the other condition of switching to apply the aforesaid second frequency to said remaining terminal; and means for controlling the aforesaid switchable means to be in said one condition during transmisison and in said other condition during reception.

According to a feature of this invention a Doppler radar system with heterodyne reception includes a source of pre-determined carrier frequency; means providing a second frequency differing from the frequency of said source by a pre-determined I.F.; two four terminal hybrids; two energy paths one extending between one of the terminals of one hybrid and one of the terminals of the other hybrid and the other extending between a second terminal of said one hybrid and a second terminal of the other; switchable means inserted in each of said paths and adapted, in one condition of switching, to render the path in which it is inserted a substantially uninterrupted energy propagating path and in the other condition of switching to render said path substantially totally reflective; a mixer with two inputs each fed from one or other of two further hybrid terminals, one in each hybrid; means connecting an output load to the remaining terminal of one hybrid; switchable means adapted in one condition of switching to apply the aforesaid carrier frequency to the remaining terminal of the other hybrid and in the other condition of switching to apply the aforesaid second frequency to said remaining terminal; means for deriving from the carrier frequency and the second frequency a derived frequency equal to the I.F.; means fed with said derived frequency and the output from said mixer for producing the Doppler frequency; and means for controlling the aforesaid switchable means to be in said one condition during transmisison and in said other condition during reception.

The carrier frequency and the second frequency may be derived through gating means from separate frequency stabilised oscillators, one for each frequency. The gating means may be conveniently constituted by gated amplifiers. Normally the frequency stabilised oscillators will be crystal controlled.

In another way of carrying out the invention the carrier frequency and second frequency are derived from a mixer fed with oscillations from a source at carrier frequency and, through gating means, from a source at I.F. whereby the carrier frequency or the second frequency is obtained from the mixer in dependence upon whether said gating means are open or closed.

The switchable means inserted in the paths between the hybrids are preferably constituted by voltage responsive semi-conductor shorting switches in waveguides providing the said paths.

Preferably the output from the mixer fed from the two hybrids is fed through gating means controlled by the means for controlling the aforesaid switchable means so as to pass energy from said mixer during reception and block it during transmission. In this way it is possible to dispense with the use of a transmit-receive (T.R.) switch for protecting the receiver proper.

Control of the gating means is preferably effected by a switching control unit controlled by a pulse source provided in the radar system and arranged to operate at the pulse repetition frequency thereof.

Preferably also the carrier frequency and the second frequency for feeding, under switched control, to one of the hybrids, are multiplied frequencies obtained by frequency multiplication of lower produced frequencies, and in the case of a Doppler radar system in accordance with this invention the said lower produced frequencies are mixed to produce a frequency which is equal to the I.F. divided by the multiplication factor, is multiplied by a second frequency multiplier of the same factor, and is then fed as one input to means for producing the Doppler frequency.

Figure 2:
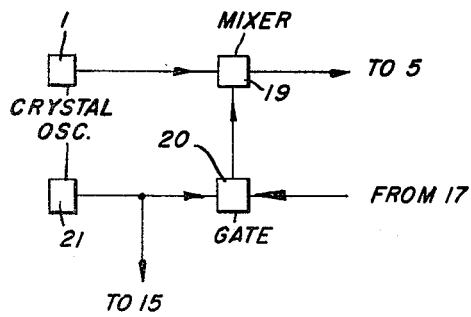

The invention is illustrated in the accompanying drawing, in which FIGURE 1 is a block schematic diagram of one form of Doppler type radar system employing the invention and FIGURE 2 shows an alternative arrangement for a portion of the radar system of FIGURE 1.

Referring to the drawing, 1 is a crystal controlled oscillator operating at the desired carrier frequency $F_T$ divided by an integral factor N. For example the carrier frequency $F_T$ may be 14,000 mc./s. and the factor N may be 192. A second crystal controlled oscillator 2 operates at a frequency $(F_T-F_1)/N$ where $F_1$ is the I.F. The I.F. may be, for example, 48 mc./s. The outputs from oscillators 1 and 2, which run continuously when the system is in operation, are fed via gated amplifiers 3 and 4 respectively to a frequency multiplier 5 having a multiplication factor N and which will accordingly receive $F_T/N$ or $(F_T-F_1)/N$ according as to whether gated amplifier 3 or 4 is closed. Multiplied output is taken from unit 5 to one port of a wave-guide hybrid 6, for example of the slot coupler type. Two of the remaining ports of this hybrid are connected each to each through wave guides to two ports of a second, similar hybrid 7, each wave guide connection having inserted at a suitable point in its length a voltage operated semiconductor wave guide switch 8 or 9. One of the two remaining ports of hybrid 7 is taken to the radar transmitting and receiving aerial 10. The remaining two hybrid ports, one in each hybrid, provide the two inputs to a mixer 11. Each of the switches 8 or 9 is constructed and arranged in manner known per se so that when in one condition it provides a substantially unimpeded through path between the two hybrids while when in the other condition it acts as a virtually total reflector for energy fed to it.

The output from the mixer 11 is fed to a gated I.F. amplifier 12 acting as a switch and the output from which forms one input to a Doppler detector 13.

Outputs from the oscillators 1 and 2 are also fed to a second mixer 14 to produce the frequency $F_1/N$ and this is multiplied by a second frequency multiplier 15 of factor N supplying the second input to Doppler detector 13. Doppler frequency is taken off from detector 13 via lead 16 and utilised in know manner for whatever purpose is required (e.g. determination of target velocity), by apparatus not shown.

The switches constituted by units 3, 4, 8, 9 and 12 are controlled by a switch control unit 17 in turn controlled by a radar pulse repetition frequency source 18 which may be any convenient source of this frequency available in the system.

The switching is such that, for transmission, i.e. during transmitted pulses, unit 3 feeds output from oscillator 1 to multiplier 5; switches 8 and 9 provide through paths between the hybrids; and unit 12 is blocked. In this condition of operation the directions of energy flow for transmission will be as indicated by the arrows lettered T, the energy inputs to the two ports of hybrid 7 being combined thereby and fed to the aerial 10. During times of reception, which may be the whole of the intervals between transmitted pulses or any desired part thereof, the switch conditions are reversed. Oscillator 2 feeds the frequency $(F_T-F_1)/N$ to the multiplier 5; the switches 8 and 9 provide points of virtually total reflection; and the unit 12 passes energy from mixer 11 to detector 13. In the condition of operation the directions of energy flow from the aerial 10, acting as a receiving aerial, will be as indicated by the arrows lettered R and the directions of energy flow (providing the heterodyne oscillations) from unit 4, will be as indicated by the arrows lettered L. As will be seen, received signals, reflected at 8 and 9 are combined by hybrid 7 and fed from one port thereof to mixer 11 while heterodyning oscillations, also reflected at 8 and 9 are combined by hybrid 6 and fed from one port thereof to constitute the other input to mixer 11.

FIGURE 2 shows an alternate embodiment in which the carrier frequency and the second frequency are derived from a mixer 19 fed with oscillations of the frequency $F_T/N$ from the crystal controlled oscillator 1 and also fed, through suitable gating means 20, from another crystal controlled oscillator 21 operating at the frequency $F_1/N$. The gating means 20 are controlled by the switch control unit 17 so that either the frequency $F_T/N$ or the frequency $(F_T-F_1)/N$ is obtained at the output of mixer 19 in dependence upon whether gating means 20 are maintained open or closed.

I claim:

1. A radar system with heterodyne reception including a source of pre-determined carrier frequency; means providing a second frequency differing from the frequency of said source by a pre-determined I.F.; two four terminal hybrids; two energy paths one extending between one of the terminals of one hybrid and one of the terminals of the other hybrid and the other extending between a second terminal of said one hybrid and a second terminal of the other; switchable means inserted in each of said paths and adapted, in one condition of switching, to render the path in which it is inserted a substantially uninterrputed energy propagating path and in the other condition of switching to render said path substantially totally reflective; a mixer with two inputs each fed from one or other of two further hybrid terminals, one in each hybrid; means connecting an output load to the remaining terminal of one hybrid; switchable means adapted in one condition of switching to apply the aforesaid carrier frequency to the remaining terminal of the other hybrid and in the other condition of switching to apply the aforesaid second frequency to said remaining terminal; and means for controlling the aforesaid switchable means to be in said one condition during transmission and in said other condition during reception.

2. A Doppler radar system with heterodyne reception including a source of pre-determined carrier frequency; means providing a second frequency differing from the frequency of said source by a pre-determined I.F.; two four terminal hybrids; two energy paths one extending between one of the terminals of one hybrid and one of the terminals of the other hybrid and the other extending between a second terminal of said one hybrid and a second terminal of the other; switchable means inserted in each of said paths and adapted, in one condition of switching, to render the path in which it is inserted a substantially uninterrupted path and in the other condition of switching to render said path substantially totally reflective; a mixer with two inputs each fed from one or other of two further hybrid terminals, one in each hybrid; means connecting an output load to the remaining terminal of one hybrid; switchable means adapted in one condition of switching to apply the aforesaid carrier frequency to the remaining terminal of the other hybrid and in the other condition of switching to apply the aforesaid second frequency to said remaining terminal; means for deriving from the carrier frequency and the second frequency a derived frequency equal to the I.F.; means fed with said derived frequency and the output from said mixer for producing the Doppler frequency; and means for controlling the aforesaid switchable means to be in said one condition during transmission and in said other condition during reception.

3. A radar system as claimed in claim 1 wherein the carrier frequency and the second frequency are derived through gating means from separate frequency stabilised oscillators, one for each frequency.

4. A radar system as claimed in claim 1 wherein the carrier frequency and the second frequency are derived from a mixer fed with oscillations from a source at carrier frequency and, through gating means, from a source at I.F. whereby the carrier frequency or the second frequency is obtained from the mixer in dependence upon whether said gating means are open or closed.

5. A radar system as claimed in claim 1 wherein the switchable means inserted in the paths between the hybrids are constituted by voltage responsive semi-conductor shorting switches in waveguides providing the said paths.

6. A radar system as claimed in claim 1 wherein the output from the mixer fed from the two hybrids is fed through gating means controlled by the means for controlling the aforesaid switchable means so as to pass energy from said mixer during reception and block it during transmission.

7. A radar system as claimed in claim 3 wherein control of the gating means is effected by a switching control unit controlled by a pulse source provided in the radar system and arranged to operate at the pulse repetition frequency thereof.

8. A radar system as claimed in claim 1 wherein the carrier frequency and the second frequency for feeding, under switched control, to one of the hybrids, are multiplied frequencies obtained by frequency multiplication of lower produced frequencies.

9. A Doppler radar system in accordance with claim 2 wherein the carrier frequency and the second frequency for feeding, under switched control, to one of the hybrids, are multiplied frequencies obtained by frequency multiplication of lower produced frequencies and wherein the lower produced frequencies are mixed to produce a frequency which is equal to the I.F. divided by the multiplication factor, is multiplied by a second frequency multiplier of the same factor, and is fed as one input to means for producing the Doppler frequency.

No references cited.

CHESTER L. JUSTUS, *Primary Examiner.*

R. D. BENNETT, *Assistant Examiner.*